Oct. 22, 1929.  T. M. REIMERS  1,732,279
WEED DESTROYING DEVICE
Filed July 27, 1927

Inventor
Theodore M. Reimers
by Arthur W^m Nelson Atty.

Patented Oct. 22, 1929

1,732,279

UNITED STATES PATENT OFFICE

THEODOR M. REIMERS, OF CHICAGO, ILLINOIS

WEED-DESTROYING DEVICE

Application filed July 27, 1927. Serial No. 208,675.

This invention relates to improvements in weed destroying devices and it consists of the matters hereinafter described and more particularly pointed out in the appended claims.

The primary object of the invention is to provide a simple, efficient and easily handled device for killing and destroying weeds, dandelions and other obnoxious plants in lawns and gardens.

A further object of the invention is to provide a device somewhat on the order of the well known oil can, for applying to the roots of such obnoxious plants, a fluid which kills the same and at the same time eliminates the possibility of such fluid being accidentally applied to or dribbled upon surrounding plants or grass stems.

These objects of the invention as well as others, together with the many advantages thereof, will more fully appear as I proceed with my specification.

Figure 1:
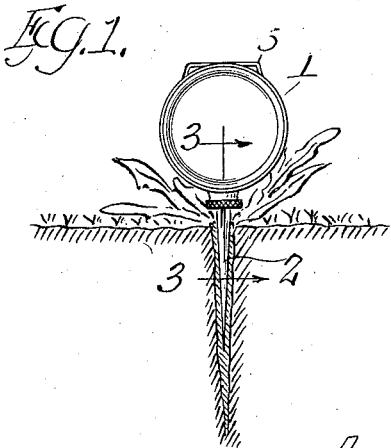
Fig. 1 is a view in side elevation of my improved device when in operation in connection with an obnoxious plant it is desired to destroy.
Figure 2:
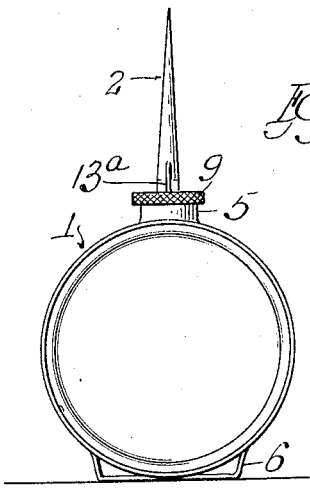
Fig. 2 is another view in side elevation of the same on an enlarged scale as when the device is in its inoperative position and not in actual use.

Referring now in detail to that embodiment of the invention illustrated in Figs. 1 to 4 inclusive of the accompanying drawing, 1 indicates the can like body of the device and 2 indicates an awl like, piercing stem or point associated therewith. The can like body is cylindrical and has opposed pressible bulged side walls 3—3 and an annular wall 4 connecting the same. On said annular wall is a radially extending, interiorly threaded neck 5 and opposite said neck, said wall is provided with a transversely extending strip 6 providing a base upon which the device as a whole may stand without tipping over when not in actual use as best shown in Fig. 2.

Removably threaded into the neck is a tubular plug 7 having an interior bore 8. The outer end of said plug has a flange 9 and a gasket 10 is seated in a recess in said flange to be engaged by the end of the neck 5 to there provide a liquid tight joint when said plug is screwed into said neck. The other end of said plug is defined by a transverse wall 11 so arranged as to extend inwardly beyond the adjacent part of the wall 4 about the neck 5. Co-axially in said wall is provided a minute opening 12 which is of such diameter as to resist a flow of liquid therethrough even when the stem extends downwardly, except when the liquid is under pressure.

Figure 3:
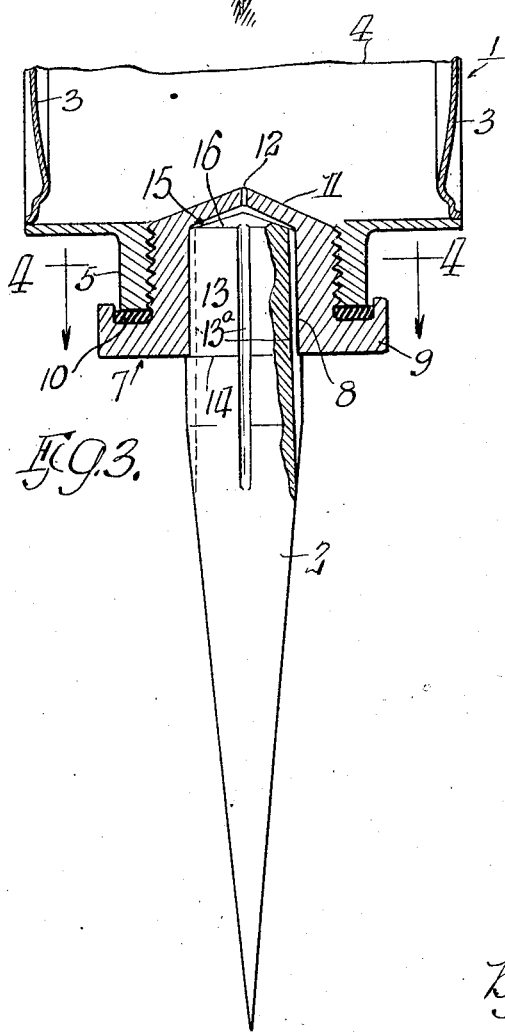
Fig. 3 is a vertical detail sectional view through a portion of the same as taken on the line 3—3 of Fig. 1.
Figure 4:
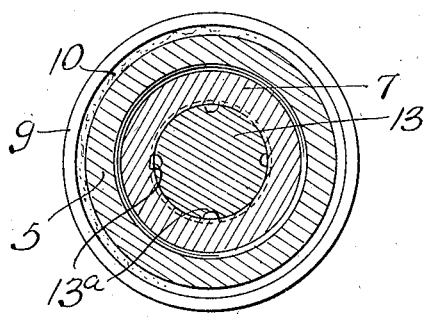
Fig. 4 is a transverse horizontal sectional view through a portion of the device as taken on the line 4—4 of Fig. 3.

The stem 2 is a relatively long one and is so shaped at its outer end, that when pushed into a plant root or adjacent soil, will make a hole without removing any material from the root or soil. The inner end 13 of said stem which is cylindrical is of a reduced diameter and has a force fit in the outer end of the bore 8 in the plug 7 and there is an annular shoulder 14 on the stem which engages the outer end of the plug and limits the entrance of said end 13 into said bore. This end portion 13 is of a depth less than that of said bore to provide a chamber 15 between the plug wall 11 and extremity 16 of said end which extremity is tapered as shown. In the periphery of said stem end 13 is provided a plurality of longitudinally extending grooves 13ª which communicate at their inner ends with the chamber 15 and open at their outer ends through the tapered exterior of the stem body as best shown in Fig. 3.

Assume that the can body 1 is filled with a weed killing fluid such as kerosene or gasoline, both of which I have found by experiment will do the work, and that the plug with the stem in place therein has been screwed into the neck of the body. The device is grasped in one hand with the thumb upon one bulged side 3 and the fingers on the other bulged side of the can body, this being the most natural way both for operating the device and for carrying it about. With the pointed stem directed downwardly, said stem is inserted into the top or crown of the plant to be destroyed and then pushed down into the root or right along side of the same until the flange 9 of the plug prevents further movement. A pressure is then imposed upon the opposite bulged sides of the can body by the fingers and thumb grasping the same. This will, in the manner of an ordinary oil can, induce a pressure in the body which will eject a small amount of fluid out through the opening 12 in the plug wall 11 and into the chamber 15. By reason of the tapered extremity 16 of the stem end 13, the fluid in the chamber 15 spreads laterally and follows down the grooves or passages 13$^a$ onto the stem below the shoulder 14 where it quickly travels down the pointed outer end part of the stem into the root of the plant or along side of the same as best shown in Fig. 1. The stem is left to remain in the plant only momentarily to permit all fluid to flow out of the chamber 15 down the grooves and onto the stem. Of course after the discharge of liquid from the can body to the chamber, the pressures equalize and no more liquid will flow out of the hole or port 12 because of its minute diameter so that there is no leaking or trickling even should the device be carried stem downward from one plant to another. The roots and soil readily absorb the fluid and kill the plant, the roots rotting and the tops shriveling up to disappear. I find a more convenient way is to remove the crown or top of the plant before treating it and in this manner the chance of skipping plants is materially reduced and when this is done the device is left in position in one plant until the top is removed from the next, which gives ample time for the liquid to flow down the stem. By means of the outlet of the grooves 13$^a$ being arranged as before described, any dirt or soil packing in the outlets in one operation, is blown or flushed out during the next operation so that said grooves cannot become plugged up. When not in actual use the device may be positioned on its base 6, stem upward as shown in Fig. 2. It is to be noted from Fig. 3 that the portion of the plug wall 11 having the hole 12 therein, is positioned above what then becomes the bottom of the body so that such foreign particles in the liquid cannot get into said hole 12 to plug up the same.

The device is simple in construction and the arrangement of the parts readily suggests the proper manner of use thereof. It may be readily made and sold at a reasonable price and is a boon for those who take pride in the appearance and condition of their lawns and gardens.

While in describing my invention, I have referred in detail to the form and arrangement of the parts thereof, the same is to be considered as illustrative only so that I do not wish to be limited thereto except as may be pointed out in the appended claims.

I claim as my invention:

1. A device of the kind described embodying therein a body adapted to contain a liquid and having at least one bulged wall, means, providing a chamber connected to the interior of said body and a stem having one end arranged in said chamber, and having at least one passage leading from said chamber to the exterior of said stem beyond but adjacent said means providing said chamber.

2. A device of the kind described embodying therein a body adapted to contain a liquid and having at least one pressable bulged wall, a plug threaded into said body and having a wall within said body with a hole connecting the interior of said body with a chamber in said plug, a pointed stem having one end disposed in the plug and having a plurality of passages that open at one end into said chamber and open at the other end to the exterior of the stem beyond said plug.

3. A device of the kind described embodying therein a body adapted to contain a liquid and having at least one pressable bulged wall, a plug threaded into said body and having a wall within said body with a hole connecting the interior of said body with a chamber in said plug, a pointed stem having one end disposed in the plug and having a plurality of longitudinally extending grooves in said stem end and that open at one end into the chamber and open at the other end to the exterior of the stem beyond the plug.

4. A device of the kind described embodying therein, a body adapted to contain a liquid and having at least one pressable bulged wall, a plug threaded into said body and having a bore therein and also one wall with a hole communicating with the interior of said body, a pointed stem having one end disposed in said bore and providing in connection therewith a chamber, the extremity of said end being tapered and there being grooves in said stem end which open at one end into said chamber and open at the other end through the exterior of said stem beyond said plug.

5. A device of the kind described embodying therein, a body adapted to contain a liquid and having at least one pressable bulged wall, and an interiorly threaded neck, a plug threaded into said neck and having an end with an opening therein, disposed inwardly of the associated wall of said body, said plug having a bore therein, a pointed stem having one end fitted into said bore and providing therewith a chamber, said stem end having longitudinal grooves therein that communicate with the chamber at one end and open through the exterior of said stem beyond said plug.

6. A stem for a device of the kind described comprising a stem body pointed at one end and having a part of reduced diameter at the other end the extremity of which is tapered, said end having longitudinal grooves therein which open through said tapered end and through said body respectively beyond said end part of reduced diameter.

In testimony whereof, I have hereunto set my hand, this 4th day of June, 1928.

THEODOR M. REIMERS.